US005739250A

United States Patent [19]
Kirchmeyer et al.

[11] Patent Number: 5,739,250
[45] Date of Patent: Apr. 14, 1998

[54] THERMOPLASTIC POLYURETHANE-UREA ELASTOMERS

[75] Inventors: Stephan Kirchmeyer, Leverkusen; Hanns-Peter Müller, Odenthal; Jürgen Fähndrich, Leverkusen; Hans-Georg Hoppe, Leichlingen, all of Germany

[73] Assignee: Bayer Aktiengesellschaft, Leverkusen, Germany

[21] Appl. No.: 655,784

[22] Filed: May 31, 1996

[30] Foreign Application Priority Data

Jun. 7, 1995 [DE] Germany .................. 195 20 730.0

[51] Int. Cl.$^6$ .................................................. C08G 18/30
[52] U.S. Cl. .................. 528/45; 528/49; 528/85
[58] Field of Search ........................ 528/45, 49, 85

[56] References Cited

U.S. PATENT DOCUMENTS

| | | | |
|---|---|---|---|
| 3,358,010 | 12/1967 | Britain | 260/453 |
| 3,846,378 | 11/1974 | Griswold | 260/77.5 TB |
| 3,947,426 | 3/1976 | Lander | 260/77.5 TB |
| 4,049,632 | 9/1977 | Magnusson et al. | 260/75 NE |
| 4,062,834 | 12/1977 | Gilding et al. | 260/77.5 AA |
| 4,071,505 | 1/1978 | Meckel et al. | 260/77.5 MA |
| 4,080,314 | 3/1978 | Bonk et al. | 260/75 NT |
| 4,101,473 | 7/1978 | Lander | 260/13 |
| 4,286,080 | 8/1981 | Quiring et al. | 525/455 |
| 4,409,380 | 10/1983 | Holubka | 528/45 |

FOREIGN PATENT DOCUMENTS

| | | |
|---|---|---|
| 744750 | 10/1966 | Canada . |
| 798427 | 11/1968 | Canada . |
| 2088521 | 8/1993 | Canada . |
| 89180 | 6/1986 | European Pat. Off. . |
| 1403693 | 8/1975 | United Kingdom . |

*Primary Examiner*—Rachel Gorr
*Attorney, Agent, or Firm*—Joseph C. Gil; Aron Preis

[57] ABSTRACT

A process for the preparation of thermoplastic polyurethaneurea elastomers is disclosed. Accordingly, organic polyisocyanates (A) and a mixture (B) containing Zerewitinoff active hydrogen atoms, are reacted to yield an intermediate product. The intermediate product is then chain extended by thermal decomposition. Reactant (B) contains B1) 40 to 85 equivalent-% (relative to isocyanate groups in (A)) at least compound having an average of at least 1.8 to 3.0, preferably 2.0, Zerewitinoff active hydrogen atoms and a molecular weight of 400 to 10000, and B2) 10 to 60 equivalent-% (relative to isocyanate groups in (A)) of at least one specifically recited tertiary hydroxyl compounds.

11 Claims, No Drawings

THERMOPLASTIC POLYURETHANE-UREA ELASTOMERS

This invention relates to thermoplastic polyurethane-urea elastomers, to a process for the production thereof and to the use thereof.

Thermoplastic polyurethanes (TPU) are of significance by virtue of their characteristic elastomeric properties. Unreinforced polyurethanes encompass a hardness range from Shore A 75 to Shore D 75, i.e. ranging from the harder thermoplastics to rubber and plasticized PVC. For certain applications (toys, household articles, automotive), there is increased interest in replacing rubber and plasticized PVC with TPU, as these are recyclable, have markedly better mechanical properties than rubber and, when incinerated, produce no acidic products. However, the requirement is for TPU with a hardness of less than Shore 75 A with good elastomeric properties.

While the hardness of TPU may in principle be adjusted by means of the quantity ratio of the starting materials, the so-called rigid/soft segment ratio (c.f. Houben-Weyl, *Methoden der Organischen Chemie*, volume E 20, G. Thieme Verlag 1987, pages 1568–1571), problems of heat resistance, mechanical properties and low-temperature flexibility arise with soft TPU. Such TPU then have inadequate strength, have a tendency to stick and are difficult to de-mold when injection molded. Soft TPU moreover crystallize relatively readily, i.e. their hardness slowly rises within a period of hours or days, rendering them unsuitable as synthetic resins.

Polyurethane-ureas are polyurethanes with additional urea groups. Soft polyurethane-ureas generally have better mechanical and thermal properties than soft polyurethanes. They are not, however, melt processable.

Polyurea elastomers with singular, i.e. unpaired, urea groups are an exception. Polyurethane-urea elastomers with singular urea groups can only be produced by the reaction of isocyanate groups with water as the reaction of isocyanate groups with diamines always produces paired urea groups. Processes for the production of thermoplastic polyurethane-urea elastomers by reacting isocyanate groups with water are known, but the products and the processes for the production thereof are not satisfactory.

The thermoplastic polyurethane-urea elastomers obtained according to DE-OS 1,645,003 contain polyurea in the form of specks and non-homogeneous zones and are therefore unusable. The production processes according to U.S. Pat. Nos. 4,049,632 and 4,062,834 are not suitable for industrial performance as large quantities of solvents are required. In the production of thermoplastic polyurethane-urea elastomers according to EP-A-21,323, the water required for the reaction must be added under such high pressure and at such high temperatures that the product is damaged during production.

The object of the invention is to provide thermoplastic polyurethane-urea elastomers, in particular with a hardness of 75 to 55 Shore A, which have excellent mechanical and thermal properties and simultaneously do not have the stated disadvantages. A further object is the continuous production of thermoplastic polyurethane-urea elastomers on the industrial scale (i.e. for example in multi-screw injection molding machines or extruders).

The present invention provides a process for the production of thermoplastic polyurethane-urea elastomers, in which process one or more polyisocyanates (A), preferably organic diisocyanates, and a mixture (B) containing Zerewitinoff active hydrogen atoms prepared from 1) 40 to 85 equivalent-% (relative to isocyanate groups in (A)) of one or more compounds having an average of 1.8 to 3.0, preferably 2.0, Zerewitinoff active hydrogen atoms and a number average molecular weight of 400 to 10000, preferably of 450 to 6000, particularly preferably of 600 to 4500, 2) 10 to 60 equivalent-% (relative to isocyanate groups in (A)) of one or more tertiary hydroxyl compounds of the general formula (I),

in which
$R^1$, $R^2$ and $R^3$ independently denote $C_1$–$C_6$ alkyl, $C_4$–$C_{10}$ cycloalkyl or $C_4$–$C_{10}$ aryl radicals, which may each optionally contain 1 to 3 oxygen atoms in the form of ether or carbonyl groups, or of the general formula (II),

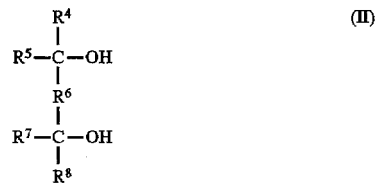

in which
$R^4$, $R^5$, $R^7$ and $R^8$ independently have the meaning stated above for $R^1$ to $R^3$, and where $R^6$ denotes a single bond or $C_1$–$C_{10}$ alkylene, $C_4$–$C_{15}$ cycloalkylene or $C_6$–$C_{10}$ arylene groups, which may each optionally also contain 1 to 3 oxygen atoms in the form of ether or carbonyl groups, 3) 0 to 45 equivalent-% (relative to isocyanate groups in (A)) of one or more chain extenders having an average of 1.8 to 3.0, preferably 2.0, Zerewitinoff active hydrogen atoms and a molecular weight of 62 to 400, optionally together with 0 to 20 wt. % (relative to the total quantity of thermoplastic polyurethane-urea) of further conventional auxiliary substances and additives (C), are reacted by polyaddition at 30° C. to 180° C. to yield an intermediate product and this is chain extended by thermal decomposition at 60° C. to 280° C. with elimination of volatile constituents to yield the thermoplastic polyurethane-urea elastomers.

The present invention furthermore provides the thermoplastic polyurethane-urea elastomers obtained in this manner.

The present invention also provides the use of the thermoplastic polyurethane-urea elastomers for the production of moldings (for example by casting, compression molding, injection molding), such as sheets, containers, equipment components, casings, rollers, gears, machinery and vehicle components, rolls, elastic coatings, films, sheathing, tubes, catheters, seals, profiles, bearing bushes and filaments.

In chemical terms, the reaction underlying the invention is similar to the synthesis of biuret groups containing branched polyisocyanates (DE-PS 1,543,178). In this synthesis, biuret groups containing polyisocyanates are formed from tert.-butylurethanes in the presence of excess NCO groups. In contrast, at the temperatures used and the stated stoichiometry under the conditions prevailing in a screw injection molding machine or extruder, no biuret branched structures are formed here, but instead speck-free, linear polyurethane-ureas.

Isocyanates (A) which may be used are aliphatic, cycloaliphatic, araliphatic, aromatic and heterocyclic polyisocyanates or any mixture of these polyisocyanates (c.f.

Houben-Weyl, *Methoden der Organischen Chemie*, volume E 20, *Makromolekulare Stoffe*, Georg Thieme Verlag, Stuttgart, N.Y. 1978, pages 1587–1593). Preferably, difunctional isocyanates are used. Examples include ethylene diisocyanate, 1,4-tetramethylene diisocyanate, 1,6-hexamethylene diisocyanate, 1,12-dodecane diisocyanate, 1,3-cyclobutane diisocyanate, 1,3- and 1,4-cyclohexane diisocyanate together with any desired mixtures of these isomers, 1-isocyanato-3,3,5-trimethyl-5-isocyanatomethylcyclo-hexane, 2,4- and 2,6-hexahydrotolylene diisocyanate together with any desired mixtures of these isomers, hexahydro-1,3- and/or -1,4-phenylene diisocyanate, perhydro-2,4'- and/or -4,4'-diphenylmethane diisocyanate, norbornane diisocyanates (for example U.S. Pat. No. 3,492,330), 1,3- and 1,4-phenylene diisocyanate, 2,4- and 2,6-tolylene diisocyanate together with any desired mixtures of these isomers, 2,4'- and/or 4,4'-diphenylmethane diisocyanate, 1,5- and 2,6-naphthylene diisocyanate together with any desired mixtures of these isomers, perhydro-1,5- and -2,6-naphthylene diisocyanate together with any desired mixtures of these and the cis/trans isomers thereof, together with 4-isocyanatophenyl-4-isocyanatobenzoate, 4-isocyanatocyclohexyl-4-isocyanatocyclo-hexanecarboxylic acid ester and the cis/trans isomers thereof.

Aromatic diisocyanates are preferred, in particular optionally alkyl-substituted tolylene and diphenylmethane diisocyanates, aliphatic diisocyanates, in particular hexamethylene diisocyanate and cyclo-aliphatic diisocyanates such as 1-isocyanato-3,3,5-trimethyl-5-isocyanatomethylcyclohexane, perhydro-2,4'- and/or -4,4'-diphenylmethane diisocyanate.

More highly functional isocyanates may also be used, such as 4,4',4"-triphenylmethane triisocyanate, polyphenyl/polymethylene polyisocyanates (for example obtained by aniline/formaldehyde condensation and subsequent phosgenation), together with the distillation residues containing isocyanate groups which arise during industrial isocyanate production, optionally dissolved in one or more of the above-stated polyisocyanates. However, care must be taken in this case to ensure that an average functionality of two is not exceeded if the polyurethanes are to be melt processed. It may be necessary to compensate for the high-functionality reactants by using other reactants having functionalities lower than two.

Monofunctional isocyanates suitable for this purpose include stearyl isocyanate, cyclohexyl isocyanate and phenyl isocyanate.

Zerewitinoff active compounds (B1) are compounds having an average of at least 1.8 Zerewitinoff active hydrogen atoms and a molecular weight of 400 to 10000.

Such compounds include, as well as compounds containing amino groups, thiol groups or carboxyl groups, in particular compounds containing two to three, preferably two hydroxyl groups, especially those of a molecular weight of 450 to 6000, particularly preferably those of a molecular weight of 600 to 4500, for example polyesters, polyethers, polycarbonates and polyesteramides containing hydroxyl groups.

Suitable polyesters are, for example, reaction products of polyhydric, preferably dihydric and optionally also trihydric alcohols with polybasic, preferably dibasic carboxylic acids or the esterifiable derivatives thereof. The polycarboxylic acids may be aliphatic, cyclo-aliphatic, aromatic and/or heterocyclic including halogen-substituted and/or unsaturated acids.

Examples of such carboxylic acids and the derivatives thereof which may be cited are: succinic acid, adipic acid, phthalic acid, isophthalic acid, phthalic arthydride, tetrahydrophthalic arthydride, hexahydrophthalic anhydride, tetrachlorophthalic arthydride, endomethylenetetrahydrophthalic anhydride, maleic acid, maleic anhydride, fumaric acid, dimerized and trimerized unsaturated fatty acids, optionally mixed with monomeric unsaturated fatty acids, terephthalic acid dimethyl ester and terephthalic acid bisglycol ester.

Polyhydric alcohols which may be considered are, for example, ethylene glycol, 1,2- and 1,3-propylene glycol, 1,4- and 2,3-butylene glycol, 1,6-hexanediol, 1,8-octanediol, neopentyl glycol, 1,4-bis(hydroxy-methyl) cyclohexane, trimethylolpropane, trimethylolethane, together with di, tri-, tetra- and higher polyethylene glycols, di- and higher poly-propylene glycols, together with di- and higher polybutylene glycols. The polyesters may contain a proportion of terminal carboxyl groups. Polyesters prepared from lactones, for example ε-caprolactone, or from hydroxycarboxylic acids, for example ω-hydroxycaproic acid, may also be used. It is, however, also possible to use hydroxy-functional polyesters known from fats chemistry, such as for example castor oil, and the transesterification products thereof.

Suitable polyethers are known per se and may be produced, for example, by the polymerization of epoxides, such as ethylene oxide, propylene oxide, butylene oxide, styrene oxide or epichlorohydrin or of tetrahydrofuran with itself, for example in the presence of Lewis catalysts such as boron trifluoride, or by the addition of epoxides, preferably of ethylene oxide and propylene oxide, optionally mixed or in succession, onto starter components with reactive hydrogen atoms such as water, alcohols, ammonia or amines, for example ethylene glycol, 1,3- or 1,2-propylene glycol, water, 4,4'-dihydroxdiphenyl-propane, aniline, ethanolamine or ethylenediamine.

Polycarbonates containing hydroxyl groups which may be considered are per se known polycarbonates which may be produced, for example, by the reaction of diols such as 1,3-propanediol, 1,4-butanediol and/or 1,6-hexanediol, diethylene glycol, triethylene glycol, tetraethylene glycol or thiodiglycol with diaryl carbonates, for example diphenyl carbonate, or phosgene (DE-OS 1,694,080, 2,221,751 ).

Suitable polyesteramides and polyamides include the predominantly linear condensation products obtained from polybasic saturated or unsaturated carboxylic acids or the anhydrides thereof and polyfunctional, saturated or unsaturated amino alcohols, diamines, polyamines and the mixtures thereof.

Polyhydroxy compounds containing high molecular weight polyaddition or polycondensation products or polymers in a finely dispersed, dissolved or graft-polymerized form are also suitable. Such modified polyhydroxy compounds may be obtained, for example, if polyaddition (for example reaction of polyisocyanates with amino-functional compounds) or polycondensation (for example of formaldehyde with phenols and/or amines) is allowed to proceed in the presence of the compounds containing hydroxyl groups. Such processes are described, for example, in DE-AS 1,168,075 and 1,126,142, as well as DE-OS 2,324,134, 2,423,984, 2,512,385, 2,513,815, 2,220,796, 2,550,797, 2,550,833, 2,550,862, 2,633,293 and 2,639,254. It is, however, also possible according to U.S. Pat. No. 3,869,413 or DE-OS 2,550,860 to mix a ready-produced aqueous polymer dispersion with a polyhydroxy compound and then to remove water from the mixture.

Polyhydroxyl compounds modified by vinyl polymerization are also suitable, as are, for example, obtained by the polymerization of styrene and acrylonitrile in the presence of polyethers (U.S. Pat. Nos. 3,383,351, 3,323,093, 3,110,695, DE-AS 1,152,536) or polycarbonate polyols (DE-PS 1,769,795, U.S. Pat. No. 3,637,909). Polybutadienes containing hydroxyl groups are also suitable.

Naturally, mixtures of the above-stated compounds may also be used, for example mixtures of polyethers and polyesters.

Tertiary hydroxyl compounds (B2) are compounds of the general formula (I)

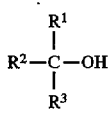

and compounds of the general formula (II) and

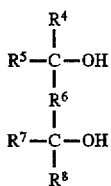

$R^1$, $R^2$ and $R^3$ independently means $C_1$–$C_6$ alkyl, for example methyl, ethyl, propyl, isopropyl, butyl, pentyl or hexyl, $C_4$–$C_{10}$ cycloalkyl, for example cyclopentyl or cyclohexyl, $C_6$–$C_{10}$ aryl, for example phenyl, toluyl or naphthyl and may optionally contain 1 to 3 oxygen atoms in the form of ether or carbonyl groups. $R^4$, $R^5$, $R^7$ and $R^8$ independently of each and independently of $R^1$ to $R^3$ have the meaning of $R^1$ to $R^3$. $R^6$ is $C_1$–$C_{10}$ alkylene, $C_4$–$C_{15}$ cycloalkylene, $C_6$–$C_{10}$ arylene, which may each optionally also contain 1 to 3 oxygen atoms in the form of ether or carbonyl groups or a single chemical bond.

Preferred compounds are those of the general formula (I), those with methyl, ethyl or phenyl groups being particularly preferred.

Suitable compounds are, for example, 1-methylcyclohexanol, 1-methylcyclopentanol, 2-methyl-4-phenyl-2-butanol, 2-methyl-2-hexanol, 2,2-dimethyl-3-ethyl-3-pentanol, 2,3-dimethyl-2,3-butanediol, 2,4-dimethyl-2,4-pentanediol, 2,5-dimethyl-2,5-hexanediol, 2,6-dimethyl-2-heptanol, 3,7-dimethyl-3-octanol, 4-hydroxy-4-methyl-2-pentanone, 4-hydroxy-2-methyl-2-pentanone, 4-hydroxy-4-methyl-2-pentanone, 9-octyl-9-heptadecanol, diacetone alcohol, p-meth-1-en-4-ol, pinacone, terpinen-4-ol, terpin hydrate and tricyclohexylmethanol.

1,1-Diphenylethanol, 1,2-diphenyl-2-propanol, 2-methyl-2-butanol, 2-methyl-2-propanol (tert.-butanol), 2-phenyl-2-butanol, 2-methyl-1-phenyl-2-propanol, 2-phenyl-2-propanol, 2,3-dimethyl-2-butanol, 2,3-dimethyl-3-pentanol, 3-methyl-3-pentanol, 3-ethyl-3-pentanol and triphenylmethanol are particularly preferred. tert.-Butanol is very particularly preferred.

Zerewitinoff active compounds (B3)—chain extenders—have an average of 1.8 to 3.0, preferably 2.0, Zerewitinoff active hydrogen atoms and a molecular weight of 62 to 400. These compounds are taken to include, as well as compounds containing amino groups, thiol groups or carboxyl groups, those with two to three, preferably two hydroxyl groups.

Examples of compounds (B3) are di- and polyols such as ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-bis(hydroxymethyl)cyclohexane, 2-methyl-1,3-propanediol, glycerol, trimethylolpropane, 1,2,6-hexanetriol, trimethylolethane and pentaerythritol, di-, tri-, tetra- and higher polyethylene glycols with a molecular weight of up to 400, together with di- and higher polypropylene glycols with a molecular weight of up to 400, 4,4'-dihydroxydiphenyl-propane, di(hydroxymethyl)hydroquinone, ethanolamine, diethanolamine, N-methyldiethanolamine, triethanolamine and 3-amino-propanol; aliphatic diamines such as, for example, ethylenediamine, 1,4-tetramethylene-diamine, hexamethylenediamine, together with the mixtures thereof, 1-amino-3,3,5-trimethyl-5-aminomethylcyclohexane ("isophoronediamine"), 2,4- and 2,6-hexahydrotoluylenediamine together with the mixtures thereof, perhydro-2,4'- and -4,4'-diaminodiphenyl-methane, p-xylylene-diamine and bis-(3-aminopropyl)methylamine; aromatic diamines which may be cited are bisanthranilic acid esters, 3,5- and 2,4-diaminobenzoic acid esters, 3,3'-dichloro-4,4'-diaminodiphenylmethane, tolylenediamine and 4,4'-diaminodiphenylmethane.

Compounds which are monofunctional towards isocyanates may also be used in proportions of up to 2 wt. %, relative to the thermoplastic polyurethaneurea elastomer, as chain terminators. Suitable compounds include monoamines such as butyl- and dibutylamine, octylamine, stearyl-amine, N-methylstearylamine, pyrrolidine, piperidine and cyclohexyl-amine, monoalcohols such as butanol, 2-ethylhexanol, octanol, dodecanol, the various amyl alcohols, cyclohexanol and ethylene glycol monomethyl ether.

The isocyanate-reactive compounds must be selected in such a manner that their average functionality does not exceed two, if melt processable polyurethane-urea elastomers are to be produced. If more highly functional compounds are used, overall functionality must be reduced to 2 by the addition of monofunctional compounds.

The quantities of the starting materials (A) and (B1), (B2) and (B3) are selected in such a manner that, for each isocyanate equivalent in (A), 40 to 85, preferably 65 to 80 equivalent-% of component (B1), 10 to 60, preferably 12 to 40 equivalent-% of (B2) and 0 to 45, preferably 0 to 10 equivalent-% of (B3) are present. The total quantity of compounds bearing amino groups or carboxyl groups in (B3) is preferably 0 to 5 equivalent.% of the isocyanate groups in (A).

In the polyurethane-ureas according to the invention, in each case two isocyanate equivalents in (A) are reacted with one hydroxyl equivalent in (B2) with elimination of an olefin and formation of a urea group. There are thus twice the quantity of isocyanate-reactive equivalents in (B2) relative to the hydroxyl equivalents in (B2).

The molar ratio of urethane groups arising from isocyanate groups in (A) and hydroxyl groups in (B1) and (B3) to the total of all urea groups is preferably 10:1 to 1:1. The total of all urea groups are those arising from the reaction of isocyanate groups in (A) with amino groups in (B1) and (B3) and urea groups arising from the reaction of two isocyanate groups in (A) with one hydroxyl group in (B2).

The quantities of the starting reactants for the preparation of polyurethane-ureas according to the invention are preferably selected in such a manner that the molar ratio of the isocyanate equivalents in (A) and the total equivalents of Zerewitinoff active hydrogen atoms in (B1), (B2) and (B3) is preferably 0.8 to 1.3, particularly preferably 0.9 to 1.1.

The thermoplastic polyurethane-urea elastomers according to the invention may contain as (C) preferably at most up to 20 wt. % (relative to the total quantity of thermoplastic polyurethane-urea) of further conventional auxiliary substances and additives.

These include, inter alia, per se known catalysts, for example tertiary amines, such as triethylamine, N-methylmorpholine, N-ethyl-morpholine, N,N,N',N'-tetramethylene-ethylenediamine, pentamethyl-diethylenetriamine, 1,4-diazabicyclo[2.2.2]octane, N-methyl-N'-dimethylaminoethylpiperazine (DE-OS 2,636,787), N,N-dimethyl-benzylamine, N,N-dimethylcyclohexylamine, 2-methylimidazole, monocyclic and bicyclic amidines (DE-OS 1,720,633), bis-(dialkyl-amino)alkyl ethers (U.S. Pat. No. 3,330,782, DE-AS 1,030,558, DE-OS 1,804,361, 2,618,280), together with tertiary amines containing amide groups (preferably formamide groups) according to DE-OS 2,523,633 and 2,732,292. Other organic metal compounds, in particular organic tin compounds, may also be used as catalysts. Organic tin compounds which may be considered, apart from compounds containing sulphur such as di-n-octyltin mercaptide (DE-AS 1,769,367, U.S. Pat. No. 3,645,927), are preferably tin(II) salts of carboxylic acids such as tin(II) acetate, tin(II) octoate and tin(II) laurate as well as tin(IV) compounds, such as dibutyltin oxide, dibutyltin dilaurate or dioctyltin diacetate. Further suitable compounds are titanium, bismuth and antimony compounds, such as antimony triisopropoxide, antimony octoate, antimony tallate, bismuth salts of carboxylic acids with 2 to 20 carbon atoms, such as for example bismuth trioctanoate, dibutylbismuth octanoate, triphenylbismuth didecanoate and dibutyltitanium bis (acetylacetonate).

Further suitable catalysts are described in *Kunststoff Handbuch* volume VII, *Polyurethane*, edited by Vieweg and Höhlen, Carl Hanser Verlag, Munich 1966, for example on pages 96 to 102.

The total quantity of catalysts in the polyurethane-urea elastomers according to the invention is about 0 to 5 wt. %, preferably 0 to 2 wt. %, relative to the total quantity of polyurethaneurea elastomer.

Further additives and auxiliary substances include: pigments, dyes, flame retardants such as tris(chloroethyl) phosphate, tricresyl phosphate or ammonium phosphate and pyrophosphate, stabilizers to counter the action of ageing and weathering, plasticizers, lubricants and mould release agents, substances with a fungistatic and bacteriostatic action together with fillers such as calcium carbonate, silica gel, barium sulphate, calcium sulphate, kaolin, bentonite, zeolites, ground glass, glass beads, fibers of glass, plastic or carbon, silica sand or silica flour, silicon carbide, aluminum trihydrate, chalk, dolomite or mixtures thereof.

The process according to the invention may be performed as follows:

Polyisocyanates (A) are reacted at temperatures of 30° C.–160° C., preferably of 60° C.–140° C., with compounds (B1), (B2) and (B3), optionally in the presence of auxiliary substances and additives (C), to yield intermediate products. The intermediate product is chain extended by thermal decomposition at temperatures of 60° C.–280° C., preferably of 180° C.–260° C. with elimination of volatile constituents to yield the thermoplastic polyurethane-urea.

The process according to the invention may be performed discontinuously, for example using glass apparatus on a laboratory scale or in tanks, or continuously, for example with the assistance of multi-screw injection molding machines or extruders.

The process may be performed in a single stage without isolating the intermediate product, for example by selecting a suitable temperature at which the reaction to yield the intermediate product proceeds simultaneously with the chain extension with elimination of volatile constituents. The process is preferably performed in two or more stages:

i) a prepolymer is produced from at least a proportion of (A) and at least a proportion of (B1) and (B2) and optionally the additives and auxiliary substances (C) and ii) this prepolymer is reacted together with the remaining starting materials and the remaining portions of (A), (B) and (C) to yield the polyurethaneurea.

In a particular variant, the total quantity of all components is reacted to yield the prepolymer. In this particular variant, this prepolymer is identical with the intermediate product. The prepolymer is then chain extended without any further additions to yield the polyurethaneurea.

In another variant, the reaction to yield the intermediate product and the chain extension to yield the polyurethane-ureas according to the invention are performed continuously in a multi-screw injection molding machine or extruder with a self-cleaning screw geometry and optionally equipped with kneading discs at temperatures of 160° C.–280° C., preferably of 180° C.–260° C. It is advisable to use screw injection molding machines or extruders which comprise two or more separately heatable or coolable barrel sections which are divided into feed zones (introduction of reactants) reaction zones and an extrusion zone. All the starting materials and/or the prepolymer were incorporated at 100° C.–180° C., preferably at 140° C.–180° C.

The thermoplastic polyurethane-urea elastomers produced using the process according to the invention have markedly better mechanical and thermal properties than comparable polymers produced using prior art processes. This applies in particular to their elastic properties, such as elongation and tensile strength, and thermal properties such as heat resistance. The thermoplastic polyurethane-ureas according to the invention may be processed into moldings in a conventional manner.

EXAMPLE 1

Example 1–8 (according to the invention)

Production of intermediate product:

The quantity of polyol stated in table 1 is desiccated for 4 hours at 140° C. and a pressure of 10 mbar in a 6 liter three-necked flask with a mechanical stirrer, internal thermometer and nitrogen inlet. The auxiliary substances comprising a catalyst, a mould release auxiliary and stabilizer are then added and the mixture cooled to 80° C. The partial quantity (A) of isocyanate is added and the temperature increased to 100° C. After 10 minutes, the quantity of tert.-butanol and the partial quantity (B) of isocyanate stated in the table are added and the mixture stirred for a further 2 hours at 100° C. In all cases, intermediate products are obtained, which are chain extended without further additions to yield thermoplastic polyurethane-ureas.

Chain extension:

2800 g per hour of intermediate products are continuously introduced into the feed hopper of a conventional screw extruder. The temperature of the various barrel sections is as follows:

| Barrel Section | 1 | 2 | 3 | 4 | 5 | 6 | 7 | Die |
|---|---|---|---|---|---|---|---|---|
| Examples 1–8 | 260 | 260 | 260 | 260 | 210 | 180 | 170 | 180 |

The polymer is degassed in barrel section 7. The polymer strand is drawn off from the die, passed through a water bath and pelletized. In all cases, water-white, completely transparent and speck-free polyurethaneurea pellets are obtained. Injection molded sheets are produced from the pellets and the sheet properties measured.

TABLE 1

| | Quantities used in grams and moles | | | | | |
|---|---|---|---|---|---|---|
| Stabilizer: | Oxidation stabilizer (Irganox 1010; commercial product of Ciba-Geigy, Basel) | | | | | |
| Catalyst: | Diazabicyclo[3.3.3]octane, 33% in dipropylene glycol | | | | | |
| Isocyanate: | 4,4'-methanediphenyl diisocyanate | | | | | |
| Mould release auxiliary: | Bisstearylamide (Hoechstwachs C; commercial product of Hoechst AG, Frankfurt) | | | | | |
| Polyol: | Polyoxytetramethylene, MW approx. 1000 | | | | | |

| Example | Stabilizer | Catalyst | Isocyanate Quantity A | B | Mold Release Agent | Polyol | tert-butanol |
|---|---|---|---|---|---|---|---|
| 1 | 3.51 g | 1.8 g | 1500 g/6.0 mol | — | 3.51 g | 4000 g/4.0 mol | 156.1 g/2.11 mol |
| 2 | 3.51 g | | 1375 g/5.5 mol | 125 g/0.5 mol | 35.1 g | 4000 g/4.0 mol | 120.9 g/1.63 mol |
| 3 | 3.51 g | | 1250 g/5.0 mol | 250 g/1.0 mol | 35.1 g | 4000 g/4.0 mol | 129.4 g/1.75 mol |
| 4 | 3.51 g | | 1437.5 g/5.75 mol | 62.5 g/0.25 mol | 35.1 g | 4000 g/4.0 mol | 119.8 g/1.62 mol |
| 5 | 3.51 g | | 1312.5 g/5.25 mol | 187.5 g/0.75 mol | 35.1 g | 4000 g/4.0 mol | 126.2 g/1.71 mol |
| 6 | 3.51 g | | 1500 g/6.0 mol | — | | 4000 g/4.0 mol | 120.2 g/1.62 mol |
| 7 | 2.98 g | | 1275 g/4.8 mol | — | | 3740 g/3.74 mol | 100.6 g 1.36 mol |
| 8 | 2.81 g | | 1200 g/4.8 mol | — | | 3840 g/3.84 mol | 47.36 g/0.64 mol |

TABLE 2

| | Properties of injection molded sheets | | | | | |
|---|---|---|---|---|---|---|
| Example | Elongation in % | Tensile strength in MPa | Stress at 100% in MPa | Stress at 300% in MPa | Shore A hardness | $T_g$ in °C |
| 1 | 638 | 20.62 | 3.95 | 7.05 | 71 | −41.5 |
| 2 | 930 | 14.41 | 3.70 | 5.81 | 72 | −47 |
| 3 | 641 | 18.83 | 4.17 | 7.12 | 72 | −49 |
| 4 | 721 | 17.55 | 3.71 | 6.13 | 71 | −46 |
| 5 | 680 | 23.48 | 4.07 | 7.05 | 72 | −50 |
| 6 | 795 | 24.48 | 4.24 | 8.27 | 72 | −46 |
| 7 | 788 | 22.08 | 3.16 | 5.63 | 67 | −47 |
| 8 | 806 | 24.61 | 2.16 | 3.37 | 64 | −43 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a thermoplastic polyurethaneurea elastomer comprising reacting by polyaddition at 30° C. to 180° C., (A) at least one polyisocyanate, with
   (B) a mixture containing
      B1) 40 to 85 equivalent-% (relative to isocyanate groups in (A)) of one or more compounds having an average of at least 1.8 to 3.0 Zerewitinoff active hydrogen atoms and a number average molecular weight of 400 to 10000, and
      B2) 10 to 60 equivalent-% (relative to isocyanate groups in (A)) of one or more tertiary hydroxyl compounds selected from the group consisting of (I) and (II) where (I) conforms to

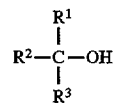

in which $R^1$, $R^2$ and $R^3$ independently denote $C_1$–$C_6$ alkyl, $C_4$–$C_{10}$ cycloalkyl or $C_4$–$C_{10}$ aryl radicals, and where (II) conforms to

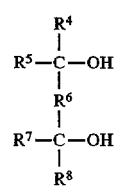

in which $R^4$, $R^5$, $R^7$ and $R^8$ independently denote $C_1$–$C_6$ alkyl, $C_4$–$C_{10}$ cycloalkyl or $C_4$–$C_{10}$ aryl radicals, and where $R^6$ denotes a single bond or $C_1$–$C_{10}$ alkylene, $C_4$–$C_{15}$ cycloalkylene or $C_6$–$C_{10}$ arylene, and B3) 0 to 45 equivalent-% (relative to isocyanate groups in (A)) of one or more chain extenders having an average of 1.8 to 3.0, Zerewitinoff active hydrogen atoms and a molecular weight of 62 to 400, and C) 0 to 20 wt. % (relative to the total quantity of thermoplastic polyurethaneurea) of further conventional auxiliary substances and additives, to yield an intermediate product and then decomposing said intermediate at 60° C. to 280° C. with elimination of volatile constituents.

2. The process of claim 1 wherein at least one of said $R^1$, $R^2$ and $R^3$ contains 1 to 3 oxygen atoms in the form of ether or carbonyl groups.

3. The process of claim 1 wherein at least one of said $R^4$, $R^5$, $R^7$ and $R^8$ contain 1 to 3 oxygen atoms in the form of ether or carbonyl groups.

4. The process of claim 1 wherein said intermediate is prepared by first reacting at least a proportion of (A) and at least a proportion of (B1) and (B2) to produce a prepolymer and then reacted said prepolymer with the complementary amounts of said (A) and/or ($B^1$) and/or (B2).

5. The process according to claim 1, in which thermal decomposition is performed at 150° C. to 280° C. in a multi-screw injection molding machine.

6. The process according to claim 1, in which thermal decomposition is performed at 150° C. to 280° C. in an extruder.

7. The process of claim 1 wherein said B2) is at least one member selected from the group consisting of 1-methylcyclohexanol, 1-methylcyclopentanol, 2-methyl-4-phenyl-2-butanol, 2-methyl-2-hexanol, 2,2-dimethyl-3-ethyl-3-pentanol, 2,3-dimethyl-2,3-butanediol, 2,4-dimethyl-2,4-pentanediol, 2,5-dimethyl-2,5-hexanediol, 2,6-dimethyl-2-heptanol, 3,7-dimethyl-3-octanol, 4-hydroxy-4-methyl-2-pentanone, 4-hydroxy-2-methyl-2-pentanone, 4-hydroxy-4-methyl-2-pentanone, 9-octyl-9-heptadecanol, diacetone alcohol, p-meth-1-en-4-ol, pinacone, terpinen-4-ol, terpin hydrate and tricyclohexyl-methanol.

8. The process of claim 1 wherein said B2) is at least one member selected from the group consisting of 1,1-Diphenylethanol, 1,2-diphenyl-2-propanol, 2-methyl-2-butanol, 2-methyl-2-propanol (tert.-butanol), 2-phenyl-2-butanol, 2-methyl-1-phenyl-2-propanol, 2-phenyl-2-propanol, 2,3-dimethyl-2-butanol, 2,3-dimethyl-3-pentanol, 3-methyl-3-pentanol, 3-ethyl-3-pentanol and triphenyl-methanol.

9. The process of claim 1 wherein said B2) is tert.-Butanol.

10. The process of claim 1 wherein molar ratio of the isocyanate equivalents in said (A) and the total equivalents of Zerewitinoff active hydrogen atoms in (B) is 0.8 to 1.3.

11. The process of claim 1 wherein molar ratio of the isocyanate equivalents in said (A) and the total equivalents of Zerewitinoff active hydrogen atoms in (B) is 0.9 to 1.1.

* * * * *